United States Patent
Lu

(10) Patent No.: US 12,340,785 B2
(45) Date of Patent: Jun. 24, 2025

(54) MICROPHONE VIBRATIONAL NOISE SUPPRESSION

(71) Applicant: Tymphany Worldwide Enterprises Limited, Taipei (TW)

(72) Inventor: Ryan Meng-Wei Lu, Grand Cayman (KY)

(73) Assignee: Tymphany Worldwide Enterprises Limited, Grand Cayman (KY)

( * ) Notice: Subject to any disclaimer, the term of this patent is extended or adjusted under 35 U.S.C. 154(b) by 318 days.

(21) Appl. No.: 18/093,571

(22) Filed: Jan. 5, 2023

(65) Prior Publication Data

US 2023/0215414 A1 Jul. 6, 2023

Related U.S. Application Data

(60) Provisional application No. 63/297,100, filed on Jan. 6, 2022.

(51) Int. Cl.
*G10K 11/178* (2006.01)

(52) U.S. Cl.
CPC .. G10K 11/17823 (2018.01); G10K 11/17873 (2018.01); *G10K 2210/3011* (2013.01); *G10K 2210/3023* (2013.01); *G10K 2210/3027* (2013.01); *G10K 2210/3028* (2013.01); *G10K 2210/501* (2013.01)

(58) Field of Classification Search
CPC ....... G10K 11/17823; G10K 11/17873; G10K 2210/3011; G10K 2210/3023; G10K 2210/3027; G10K 2210/3028; G10K 2210/501; H04R 2410/03

See application file for complete search history.

(56) References Cited

U.S. PATENT DOCUMENTS

| 8,626,500 B2 * | 1/2014 | Washisu | H04N 5/60 704/226 |
| 9,466,281 B2 | 10/2016 | Hoang Co Thuy et al. | |
| 10,741,162 B1 | 8/2020 | Bastyr | |
| 10,810,991 B2 | 10/2020 | Zaferopoulos | |
| 11,462,230 B1 * | 10/2022 | Sztuk | G10L 21/0232 |
| 2007/0047744 A1 * | 3/2007 | Harney | H04M 1/035 381/174 |

(Continued)

FOREIGN PATENT DOCUMENTS

CN 112788466 5/2021

*Primary Examiner* — Jason R Kurr
(74) *Attorney, Agent, or Firm* — Finnegan, Henderson, Farabow, Garrett & Dunner, LLP

(57) ABSTRACT

An audio system may include a microphone configured to sense sound and generate an analog audio signal; an analog-to-digital convertor (ADC) configured to convert the analog audio signal to a digital audio signal having a first bit rate; a motion sensor configured to sense motion associated with the microphone and generate a motion signal representative of the motion associated with the microphone; a motion signal conversion module configured to convert the motion signal to a digital audio noise signal having a second bit rate synchronized with the first bit rate; and a noise suppression module configured to at least partially suppress the digital audio noise signal relative to the digital audio signal to generate a noise-suppressed digital audio signal.

16 Claims, 2 Drawing Sheets

(56) References Cited

U.S. PATENT DOCUMENTS

| | | | |
|---|---|---|---|
| 2008/0192963 A1* | 8/2008 | Sato | H04R 19/04 |
| | | | 381/174 |
| 2018/0077507 A1* | 3/2018 | Bernal Castillo | G01H 17/00 |
| 2018/0203514 A1 | 7/2018 | Nakagawa et al. | |
| 2021/0185229 A1* | 6/2021 | Dick | H04R 3/002 |
| 2021/0264893 A1 | 8/2021 | Liu et al. | |

\* cited by examiner

MICROPHONE VIBRATIONAL NOISE SUPPRESSION

This application claims the benefit of priority of U.S. Provisional Application No. 63/297,100 filed on Jan. 6, 2022, the entire contents of which are hereby incorporated by reference.

TECHNICAL FIELD

The present disclosure relates generally to active noise suppression in audio signals, in particular suppressing noise caused by microphone motion.

BACKGROUND

Microphones are often mounted on a desktop stand, microphone arm or other stand or support to avoid picking up vibrations or other movements, which can otherwise produce unwanted noise in the audio signal output by the microphone. When an impact occurs, such as may be caused by the microphone falling over or an unintentional impact on the microphone, the impact vibrations are picked up by the microphone transducer and cause a strong unwanted noise signal in the microphone audio output.

To address this issue, some microphones feature limiters that limit the intensity of the microphone audio signal output. Another approach is to momentarily mute or suppress the microphone audio signal output if the intensity of the microphone audio signal exceeds a set threshold or limit.

Although these approaches may be effective to some extent, the unwanted noise still undesirably affects the audio signal. For example, limiting, muting or otherwise suppressing the audio signal causes the audio components that are desired (e.g., vocals or instrument sounds) to be abruptly muted or suppressed together with the unwanted noise. Also, when the microphone picks up unwanted noise caused by vibrations or other movements that are not so extreme (e.g., the intensity of the noise is less than the threshold required to trigger the limiter), the unwanted noise may still be picked up and output together with the desired components of the audio signal.

There is a need, therefore, for methods and systems for suppressing unwanted audio noise signals caused by impacts or other motion associated with a microphone that overcome these and other shortcomings of existing methods.

SUMMARY

Consistent with disclosed embodiments, an audio system may include a microphone configured to sense sound and generate an analog audio signal; an analog-to-digital convertor (ADC) configured to convert the analog audio signal to a digital audio signal having a first bit rate; a motion sensor configured to sense motion associated with the microphone and generate a motion signal representative of the motion associated with the microphone; a motion signal conversion module configured to convert the motion signal to a digital audio noise signal having a second bit rate synchronized with the first bit rate; and a noise suppression module configured to at least partially suppress the digital audio noise signal relative to the digital audio signal to generate a noise-suppressed digital audio signal.

In other embodiments, an audio system may include a microphone configured to sense sound and generate an analog audio signal; a motion sensor configured to sense motion associated with the microphone and generate a motion signal representative of the motion associated with the microphone; and a signal processing system configured to: convert the analog audio signal to a digital audio signal having a first bit rate; convert the motion signal into a digital audio noise signal having a second bit rate synchronized with the first bit rate; and at least partially suppress the digital audio noise signal relative to the digital audio signal to generate a noise-suppressed digital audio signal.

Other embodiments may include a method for active audio noise suppression, comprising: sensing sound using a microphone and generating an analog audio signal; sensing a motion of the microphone using a motion sensor and generating a motion signal representative of the motion of the microphone; converting the analog audio signal to a digital audio signal having a first bit rate; converting the motion signal into a digital audio noise signal having a second bit rate synchronized with the first bit rate; and at least partially suppressing the digital audio noise signal relative to the digital audio signal to generate a noise-suppressed digital audio signal.

BRIEF DESCRIPTION OF DRAWING(S)

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

Figure 1:
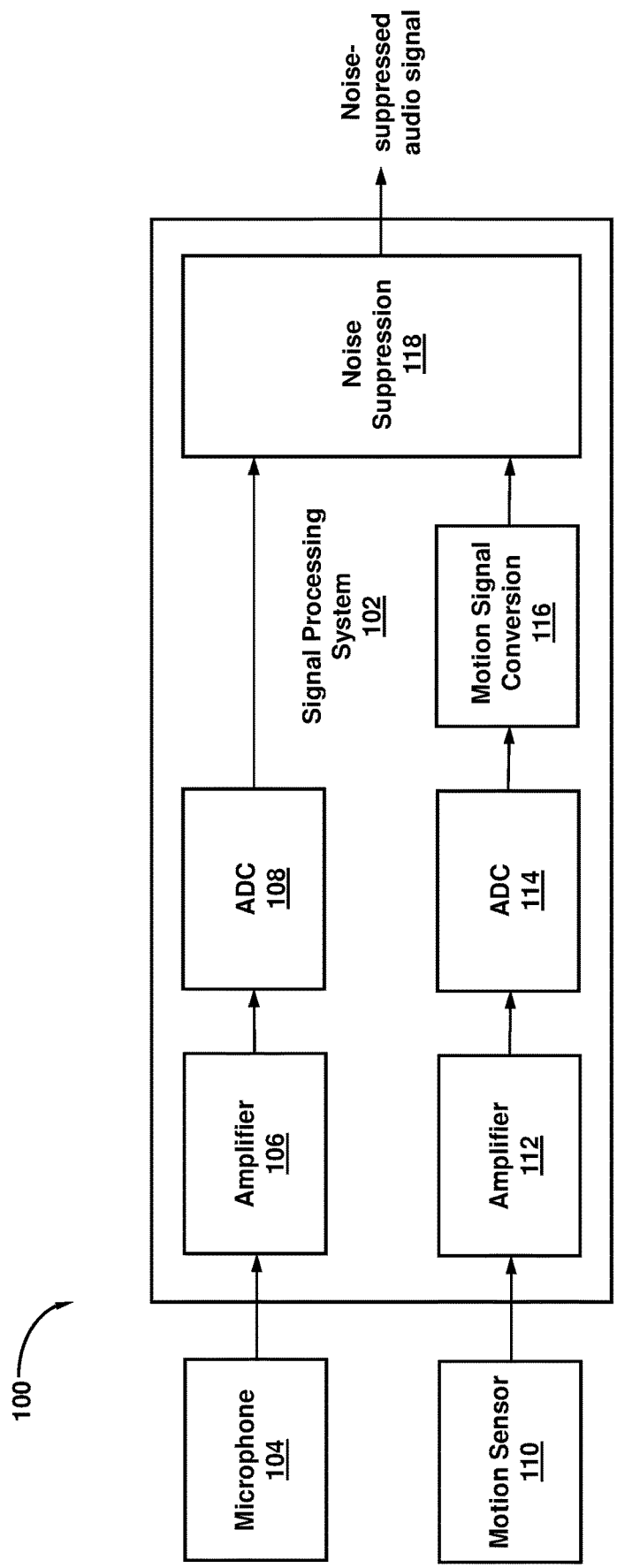
FIG. 1 is a diagrammatic representation of an exemplary audio system for active noise suppression consistent with some embodiments of the present disclosure.

Referring to FIG. 1, audio system 100 may include a microphone 104 for sensing sound and generating audio signal output representative of the sensed sound. Microphone 104 comprises a transducer that converts sensed sound into an analog electrical signal. Microphone 104 therefore generates an analog audio signal. The audio signal generated by microphone 104 may contain noise signals associated with motion of microphone 104, in particular vibrational motion. For example, the audio signal output generated by microphone 104 may contain noise signals associated with an impact, hit, or strike on microphone 104.

Audio processing system 100 may also include a motion sensor 110 (e.g., including an accelerometer) configured to sense motion associated with microphone 104 and generate a motion signal output representative of the sensed motion. For example, motion sensor 110 may comprise a transducer configured to generate an analog electrical signal in response to motion of motion sensor 110. Motion sensor 110 may therefore generate an analog motion signal output.

The sensed motion may include motion of microphone 104 itself. Alternatively, or additionally, the sensed motion may be or may include motion of an object to which microphone 104 is physically coupled, such as a microphone stand or other microphone support structure. Motion sensor 110 may therefore be physically coupled, either directly or indirectly, to microphone 104 so that motion sensor 110 is able to sense motion associated with microphone 104. For example, motion sensor 110 may be attached to, or mounted on or in, microphone 104.

Motion sensor 110 may be or may include an accelerometer. The accelerometer may be a vibration sensor, and the sensed motion may include vibrational motion associated with microphone 104. The sensed motion may result from an impact, hit, or strike that results in motion of microphone 104, for example an impact, hit or strike on microphone 104 or on a structure physically coupled to microphone 104.

Audio system 100 may comprise a signal processing system 102. Signal processing system 102 refers collectively to the components of audio system 100 that are configured to process the signals output by microphone 104 and motion sensor 110. Signal processing system 102 may comprise various components, as will be described in further detail below. The various components of signal processing system 102 need not necessarily be parts of the same physical unit or device. Some or all of the component parts of signal processing system 102 may be implemented using shared hardware and/or software, but equally the components of signal processing system 102 may be implemented as separate and distinct entities or in different devices.

Signal processing system 102 may comprise a first amplifier 106 configured to receive the analog audio signal from microphone 104. Amplifier 106 amplifies the analog audio signal output by microphone 104 and therefore provides gain to the analog audio signal. Amplifier 106 may include a pre-amplifier, and may, for example, include a programmable gain amplifier (PGA) or a gain block. Amplifier 106 may amplify the analog audio signal to match the range of the analog audio signal to the range of a first analog-to-digital convertor (ADC) 108 (discussed in further detail below). For example, amplifier 106 may amplify the analog audio signal to match or substantially match the range of the analog audio signal to the range of analog-to-digital convertor (ADC) 108.

Signal processing system 102 may include first ADC 108. ADC 108 is configured to receive the analog audio signal, optionally amplified by amplifier 106 if present, and convert the analog audio signal to a digital audio signal. The digital audio signal may have, or may be characterized by, a first bit rate and a first sampling rate. The bit rate is the data content, in terms of the number of bits, conveyed by the signal per unit of time, and is typically expressed in bits/s or bps. The sampling rate, or sampling frequency, defines the number of samples per unit time taken from a continuous signal (in this case the analog audio signal) to generate a corresponding digital signal (in this case the digital audio signal). The sampling rate therefore determines the resolution of the signal in the time domain, and, for a given sampling rate, the bit rate determines the resolution of the value of the signal (i.e. the signal intensity or amplitude of the audio signal) at each sampling point. ADC 108 may include any sort of ADC capable of converting the analog audio signal to a digital audio signal. For example, ADC 108 may include, without limitation, a flash or direct ADC, a semi-flash ADC, an SAR ACD, a sigma-delta ACD or a pipelined ACD.

In some embodiments, microphone 104, amplifier 106 and ADC 108 may be incorporated into a single device, such as a MEMS (micro-electromechanical system) microphone device. In other embodiments, microphone 104, amplifier 106 and ADC 108 may be included in multiple discrete devices.

Signal processing system 102 may comprise a second amplifier 112 configured to receive the motion signal output from motion sensor 110. Amplifier 112 amplifies the analog motion signal output by motion sensor 110 and therefore provides gain to the analog motion signal. Amplifier 112 may include a pre-amplifier, and may, for example, include a programmable gain amplifier (PGA) or a gain block. Amplifier 112 may amplify the analog motion signal to match the range of the analog motion signal to the range of a second analog-to-digital convertor (ADC) 114 (discussed in further detail below). For example, amplifier 112 may amplify the analog motion signal to match or substantially match the range of the analog motion signal to the range of analog-to-digital convertor (ADC) 114.

Signal processing system 102 may include second ADC 114. ADC 114 is configured to receive the analog motion signal, optionally amplified by amplifier 112 if present, and convert the analog motion signal to a digital motion signal. ADC 114 may include any sort of ADC capable of converting the analog motion signal to a digital motion signal. For example, ADC 114 may include, without limitation, a flash or direct ADC, a semi-flash ADC, an SAR ACD, a sigma-delta ACD or a pipelined ACD.

In some embodiments, motion sensor 110, amplifier 112 and ADC 114 may be incorporated into a single device, such as a MEMS accelerometer device. In other embodiments, motion sensor 110, amplifier 112 and ADC 114 may be included in multiple discrete devices.

Still referring to FIG. 1, signal processing system 102 may comprise a motion signal conversion module 116. Motion signal conversion module 116 may be configured to convert the motion signal (e.g., a motion signal originating from motion sensor 110 as conditioned by amplifier 112 and ADC 114) to a digital audio noise signal. Both the motion signal and the audio signal are characterized by frequencies and amplitudes. The motion (e.g., vibration) represented by the motion signal causes corresponding noise signals to be generated in the audio signal having frequency and amplitude characteristics that correspond to those of the motion signal. It is therefore possible to convert the motion signal into an audio noise signal that represents the noise in the audio signal caused by the sensed motion represented by the motion signal. Motion signal conversion module 116 performs this conversion. For example, the conversion may include a sampling rate conversion and an application of a predetermined/pre-calculated transfer function.

Motion signal conversion module 116 may be configured to generate the digital audio noise signal so that the digital audio noise signal has, or is characterized by, a second bit rate. This second bit rate associated with the digital audio noise signal may be synchronized with the first bit rate of the digital audio signal. For example, motion signal conversion module 116 may generate the digital audio noise signal so that the digital audio noise signal has a second bit rate that is substantially matched to the first bit rate of the digital audio signal. In other words, the second bit rate may be substantially equal to the first bit rate. Alternatively, the second bit rate may be an integer or rational fraction multiple of the first bit rate (e.g. ¼, ½, 2×, 4× etc.).

Motion signal conversion module 116 may be configured to generate the digital audio noise signal so that the digital audio noise signal has, or is characterized by, a second sampling rate that is synchronized with the first sampling rate of the digital audio signal. For example, motion signal conversion module 116 may generate the digital audio noise signal so that the digital audio noise signal has a second sampling rate that is substantially matched to the first sampling rate of the digital audio signal. In other words, the second sampling rate may be substantially equal to the first sampling rate. Alternatively, the second sampling rate may be an integer or rational fraction multiple of the first sampling rate (e.g. ¼, ½, 2×, 4× etc.).

Synchronizing the first and second bit rates may improve the suppression of the digital audio noise signal from the digital audio signal that is described in more detail below. This is because the resolution of the intensity scales of the digital audio noise signal and the digital audio signals may be better synchronized. Likewise, synchronizing the first and second sampling rates may also improve the suppression of the digital audio noise signal from the digital audio signal that is described in more detail below. This is because the resolutions of the digital audio noise signal and the digital audio signals in the time domain may be better synchronized.

Still referring to FIG. 1, signal processing system 102 may further comprise a noise suppression module 118. Noise suppression module 118 is configured to at least partially suppress the digital audio noise signal relative to, or from, the digital audio signal to generate a noise-suppressed digital audio signal output. In other words, noise suppression module 118 is configured to at least partially suppress audio noise in the digital audio signal that corresponds to the digital audio noise signal. Since the digital audio noise signal corresponds to noise in the digital audio signal caused by the motion (e.g., vibration, shock, etc.) sensed by motion sensor 110, this has the effect of at least partially suppressing audio noise caused by the sensed motion in the digital audio signal. Noise suppression module 118 may therefore receive both the digital audio signal and the digital audio noise signal, and may at least partially suppress or cancel noise from the digital audio signal based on the digital audio noise signal. Noise suppression unit 118 therefore processes the digital audio noise signal output by motion signal conversion module 116 to remove noise from the digital audio signal.

In some embodiments, the noise suppression module operates as a feedforward operator, such as a feedforward filter, to at least partially suppress the digital audio noise signal relative to the digital audio signal output. Noise suppression module may, for example, process the digital audio noise signal using a feedforward operator to at least partially suppress noise corresponding to the digital audio noise signal (i.e., noise caused by the sensed motion) from the digital audio signal. A feedforward operator acts on a target or load in response to a control signal from a source. An operator that has only feedforward behavior responds to its control signal in a pre-defined way without responding to the way the load reacts or varies with respect to the control. This is in contrast to a system that also has feedback behavior, which takes into account how the control affects the load. In the present case, the control is the digital audio noise signal, and the feedforward filter acts to suppress audio noise in the digital audio signal (the load) corresponding to the digital audio noise signal (and associated with the sensed motion) before sound corresponding to the audio noise is output, for example by a speaker, which would affect the digital audio signal through feedback.

Noise suppression module 118 may be configured to completely cancel audio noise corresponding to the digital audio noise signal from the digital audio signal. Alternatively, noise suppression module 118 may be configured to partially cancel audio noise corresponding to the digital audio noise signal from the digital audio signal, allowing some noise to remain in the audio signal. For example, noise suppression module 118 may be configured to remove a certain portion of the digital audio noise signal from the digital audio signal.

Signal processing system 102 may process the audio signal and motion signals in real-time, as the signals are output respectively by microphone 104 and motion sensor 110. The noise associated with the sensed movement may therefore be suppressed in real time, or on-the-fly. Alternatively, signal processing system 102 may be used to post-process the audio signal.

The various components of audio processing system 102 may be implemented using hardware and/or software. For example, motion signal conversion module 116 and noise suppression module 118 may be implemented using any suitable processing hardware or logic devices including one or more dedicated processing units, CPUs, application-specific integrated circuits (ASICs), field-programmable gate arrays (FPGAs), or various other types of processors or processing units. The various components of signal processing system 102 need not be separate and distinct entities, and may, for example, be implemented using the same instances of hardware and/or software. For example, motion signal conversion module 116 and noise suppression module 118 may be implemented as instructions stored on one or more computer-readable storage media that are executed by one or more processors or processing units to provide the required signal processing functionality.

Figure 2:
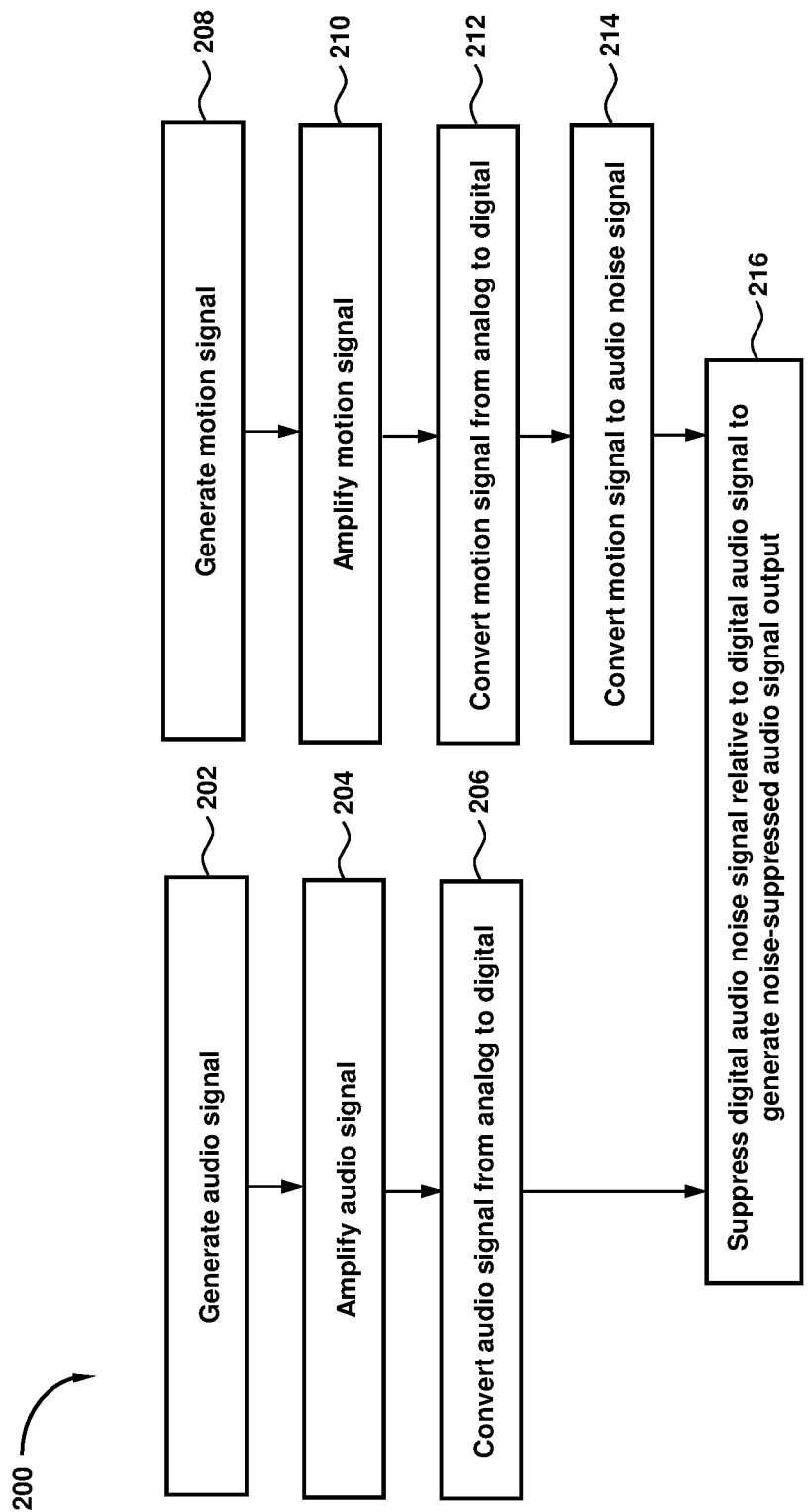
FIG. 2 represents a method for active noise suppression consistent with some embodiments of the present disclosure.

Referring to FIG. 2, the present disclosure also provides a method 200 for active noise suppression. Method 200 generally corresponds to the actions performed by system 100. As such, the same or similar considerations apply, and the principles outlined in the context of system 100 generally apply to the corresponding steps of method 200. However, the steps of method 200 are not necessarily tied to the same functional entities as recited in relation to system 100 and it is the method steps themselves rather than the components of the system that are generally defined by method 200.

Method 200 may include step 202 of generating an audio signal. Step 202 may involve sensing sound using a microphone, such as microphone 104 of system 100 described above, and generating an analog audio signal output representative of the sensed sound.

Method 200 may optionally comprise step 204 of amplifying the obtained audio signal. For example, an amplifier such as amplifier 106 of system 100 may amplify the analog audio signal generated in step 202 to provide gain to the analog audio signal. The audio signal may be amplified to match or substantially match the range of the analog audio signal to the range of the ADC used to convert the analog audio signal to a digital audio signal in step 206 discussed below.

Method 200 may comprise step 206 of converting the analog audio signal, optionally amplified in step 204, to a digital audio signal. Step 206 may be performed using an ADC, such as ADC 108 of system 100. As described above in relation to system 100, the digital audio signal generated in step 206 may have a first bit rate and a first sampling rate.

Method 200 may comprise step 208 of generating a motion signal. Step 208 may comprise sensing a motion representative of the microphone using a motion sensor, such as motion sensor 110 of system 100, and generating a motion signal output representative of the motion of the microphone. As explained above in relation to motion sensor 110 of system 100, the sensed motion may include or may be motion of the microphone used to record the audio signal in step 202. Alternatively, or additionally, the sensed motion may be or may include motion of an object to which microphone is physically coupled, such as a microphone stand or other microphone support structure. The motion signal may be an analog motion signal.

Method 200 may optionally comprise step 210 of amplifying the motion signal. For example, an amplifier, such as amplifier 112 of system 100, may amplify the analog motion signal generated in step 208 to provide gain to the analog motion signal. The analog motion signal may be amplified to match or substantially match the range of the analog motion signal to the range of the ADC used to convert the analog motion signal to a digital motion signal in step 212 discussed below.

Method 200 may optionally comprise step 212 of converting the analog motion signal signal, optionally amplified in step 210, into a digital motion signal. Step 212 may be performed using an ADC such as ADC 114 of system 100.

Method 200 may comprise step 214 of converting the digital motion signal into a digital audio noise signal. Step 214 may be performed using a motion signal conversion module, such as motion signal conversion module 116 of system 100. The digital audio noise signal may be generated in step 214 to have a second bit rate synchronized with the first bit rate of the digital audio signal. For example, the second bit rate may be substantially matched to the first bit rate. Similarly, digital audio noise signal may be generated in step 214 to have a second sampling rate synchronized with the first sampling rate of the digital audio signal. For example, the second sampling rate may be substantially matched to the first sampling rate.

Method 200 may comprise step 216 of at least partially suppressing the digital audio noise signal relative to the digital audio signal to generate a noise-suppressed digital audio signal output. Step 216 may be performed using a noise suppression module, such as noise suppression module 118 of system 100 described above. As such, step 216 may involve actions that substantially correspond to the actions performed by noise suppression module 118 described above. For example, the digital audio noise signal may be at least partially suppressed from the digital audio signal using a feedforward operator, such as a feedforward filter.

The steps of the example methods set forth herein are not necessarily required to be performed in the order described, and the order of the steps of such methods should be understood to be merely example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

The described embodiments are not mutually exclusive, and elements, components, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. A microphone device, comprising:
   a microphone support structure;
   a microphone physically coupled with the microphone support structure and configured to sense sound and generate an analog audio signal containing noise signals associated with motion of the microphone and the microphone support structure;
   a first amplifier configured to amplify the analog audio signal to match the range of the analog audio signal to the range of a first analog-to-digital convertor (ADC) wherein
   the first analog-to-digital convertor (ADC) is configured to convert the analog audio signal to a digital audio signal having a first bit rate and a first sample rate;
   a motion sensor physically and directly mounted in the microphone and configured to sense motion associated with the microphone and generate a motion signal representative of the motion associated with the microphone and the microphone support structure;

a second amplifier configured to amplify the motion signal to match the range of the motion signal to the range of a second analog-to-digital convertor (ADC);

a motion signal conversion module configured to convert the motion signal to a digital audio noise signal having a second bit rate synchronized with the first bit rate and having a second sample rate synchronized with the first sample rate, wherein the second bit rate is substantially equal to the first bit rate, and the second sampling rate is substantially equal to the first sampling rate; and a noise suppression module configured to at least partially suppress the digital audio noise signal relative to the digital audio signal to generate a noise-suppressed digital audio signal.

2. The audio system of claim 1, wherein the motion sensor includes an accelerometer.

3. The audio system of claim 2, wherein the accelerometer is a vibration sensor.

4. The audio system of claim 1, wherein the motion associated with the microphone includes vibration of the microphone, and wherein the motion signal is representative of the vibration.

5. The audio system of claim 1, wherein the motion sensor outputs the motion signal as an analog motion signal, and wherein the audio system further comprises a second analog-to-digital convertor (ADC) configured to convert the analog motion signal to a digital motion signal.

6. The audio system of claim 1, wherein the noise suppression module operates as a feedforward operator to at least partially suppress the digital audio noise signal relative to the digital audio signal and to generate the noise-suppressed digital audio signal.

7. The audio system of claim 1, wherein the motion associated with the microphone is caused by an impact, and wherein the digital audio noise signal is representative of audio noise resulting from the impact.

8. A microphone device, comprising:
a microphone support structure;
a microphone physically coupled with the microphone support structure and configured to sense sound and generate an analog audio signal containing noise signals associated with motion of the microphone and the microphone support structure;
a first amplifier configured to amplify the analog audio signal to match the range of the analog audio signal to the range of a first analog-to-digital convertor (ADC);
a motion sensor physically and directly mounted in the microphone and configured to sense motion associated with the microphone and generate a motion signal representative of the motion associated with the microphone and the microphone support structure;
a second amplifier configured to amplify the motion signal to match the range of the motion signal to the range of a second analog-to-digital convertor (ADC); and
a signal processing system configured to:
convert the analog audio signal to a digital audio signal having a first bit rate and a first sample rate;
convert the motion signal into a digital audio noise signal having a second bit rate synchronized with the first bit rate and having a second sample rate synchronized with the first sample rate, wherein the second bit rate is substantially equal to the first bit rate, and the second sampling rate is substantially equal to the first sampling rate; and
at least partially suppress the digital audio noise signal relative to the digital audio signal to generate a noise-suppressed digital audio signal.

9. The audio system of claim 8, wherein the signal processing system includes one or more components that operate as a feedforward operator configured to at least partially suppress the digital audio noise signal relative to the digital audio signal to generate the noise-suppressed digital audio signal.

10. A method for active audio noise suppression of a microphone device having a microphone and a microphone support structure, comprising:
sensing sound using the microphone physically coupled with the microphone support structure and generating an analog audio signal containing noise signals associated with motion of the microphone and the microphone support structure;
amplifying the analog audio signal to match the range of the analog audio signal to the range of a first analog-to-digital convertor (ADC);
sensing a motion of the microphone using a motion sensor and generating a motion signal representative of the motion of the microphone and the microphone support structure;
amplifying the motion signal to match the range of the motion signal to the range of a second analog-to-digital convertor (ADC);
converting the analog audio signal to a digital audio signal having a first bit rate and a first sampling rate;
converting the motion signal into a digital audio noise signal having a second bit rate synchronized with the first bit rate and having a second sample rate synchronized with the first sample rate, wherein the second bit rate is substantially equal to the first bit rate, and the second sampling rate is substantially equal to the first sampling rate; and
at least partially suppressing the digital audio noise signal relative to the digital audio signal to generate a noise-suppressed digital audio signal.

11. The method of claim 10, wherein the motion sensor includes an accelerometer.

12. The method of claim 11, wherein the accelerometer is a vibration sensor.

13. The method of claim 10, wherein the motion of the microphone includes vibration of the microphone and wherein the motion signal is representative of the vibration.

14. The method of claim 10, wherein the motion sensor outputs the motion signal as an analog motion signal, and wherein the method further comprises converting the analog motion signal to a digital motion signal.

15. The method of claim 10, wherein the digital audio noise signal is at least partially suppressed using a feedforward filtering technique.

16. The method of claim 10, wherein the motion of the microphone is caused by an impact, and wherein the digital audio noise signal is representative of audio noise resulting from the impact.

* * * * *